United States Patent [15] 3,639,732

Crain et al. [45] Feb. 1, 1972

[54] DATA CONTROL DEVICE

[72] Inventors: Norman Robert Crain, Huntington Beach; Donald E. Rea, Santa Ana, both of Calif.

[73] Assignee: Documentor Sciences Corporation, Santa Ana, Calif.

[22] Filed: Feb. 2, 1970

[21] Appl. No.: 7,576

[52] U.S. Cl. ............................................................235/61.12

[51] Int. Cl. ............................................................G06k 19/06

[58] Field of Search .............235/61.12 R, 61.12 N, 61.12 M, 235/61.12 C, 61.6 E, 61.11 E; 250/219 Q, 219 D, 219 DD; 35/48 R, 48 A, 48 B

[56] References Cited

UNITED STATES PATENTS

| | | | |
|---|---|---|---|
| 2,735,617 | 2/1956 | Knutsen | 235/61.12 N |
| 3,284,929 | 11/1966 | Azure, Jr. | 235/61.6 E |
| 3,350,545 | 10/1967 | Street | 250/219 D |
| 3,365,714 | 1/1968 | Timares et al. | 250/219 C |

*Primary Examiner*—Daryl W. Cook
*Attorney*—Spensley, Horn and Lubitz

[57] ABSTRACT

A data control device adapted for controlling data in connection with an optical or magnetic detection device is disclosed. The main body of a paper structure of predetermined dimensions has a plurality of horizontal rows extending across a plurality of vertical columns formed by pairs of separated contrast stripes. One vertical column provides timing or reference signals for the data contained in the horizontal rows. Data is entered by connecting at least two vertical stripes in a horizontal row with a connecting indicia. The space between the stripes may have numbered indicia means for indicating the value entered. In one embodiment, portions of the control device are provided with detection means for absorbing energy of an incident light source, thus, providing means for optical detection. The control device is particularly adaptable for use in restaurants and hotels and similar business where bill totalization is required.

11 Claims, 4 Drawing Figures

INVENTORS.
N. ROBERT CRAIN,
DONALD E. REA,

BY THEIR ATTORNEYS
Spensley & Horn

DATA CONTROL DEVICE

BACKGROUND OF THE INVENTION

1. Field of the Invention

The invention is related to the field of computer input devices, and more specifically to that class of devices adaptable for optical or magnetic detection.

2. Prior Art

Data cards and similar devices are commonly utilized in todays technology. The devices disclosed by the prior art are typically constructed of stiff, pressed paper or similar materials adapted for being punched. The card or devices are typically used as an input means for a computer, business machine or other like device. In these apparatus, the cards are most often divided into imaginary rows and columns, with the presence or absence of punched insertions in the cards defining the data.

In prior art devices or cards, typically the original data is recorded manually by handwriting or printing means such as a typewriter and then reduced to a machine-readable form through the use of punch cards. The obvious problem inherent in this procedure is that the data is recorded twice and it is difficult for a person to obtain understandable information from the computer input card. The data must first be initially recorded by a person and then subsequently converted into a form which can be read by an optical, magnetic or mechanical device. The time and expense required to reduce data to a punched card or other suitable form which can be read by a machine is a limiting factor in the use of such devices.

Another problem created by those media utilizing punched cards is the physical properties of the card itself. In order to hold its form upon punching, the media must be stiff enough so as to preclude the possibility that the media will be severed within the bounds of the media. If this was to occur, the member will become useless with a resulting loss of data.

The prior art also discloses the use of tabulating cards which do not need punches, but instead provide for the optical sensing of marks on the card. These members are typically highly opaque, stiff cards which present specific areas which must be accurately provided with indicia. The problems left unresolved by this structure are many. Since the structure of the card is generally stiff in nature, the card is generally limited to nondynamic reading processes.

Another of the problems not solved by the prior art devices is error detection. No means are provided whereby the optical device is tested by the data structure card itself. This obviously could lead to errors that could not be corrected without lengthy correction procedures.

SUMMARY OF THE INVENTION

The present invention data control device solves the problems left unresolved by the prior art. The present invention structure is paper thereby providing a highly flexible low-cost structure which may be readily padded and written or printed upon. The data columns are formed by columns of a differing hue (e.g., contrast stripes) thereby providing for improved detection capability. Timing tracks are provided to enable the reading device to be synchronized with the data thereby eliminating problems relative to misregistration, such as skew. Data entry and a visual record are formed by the same record. The present invention structure also enables the optical detection device to be verified for operability by the inclusion of a machine check member.

The present invention data bearing structure is a paper member adapted to manually record data in a manner which is directly detectable by an optical detection system or other appropriate detection device and visually understandable. The present invention structure is typically a paper member to overcome the restrictive requirements placed on the prior art devices. The paper member in one form is longitudinally segmented into three zones, a header zone, a data zone and a third zone used for purposes not related to automatic optical detection. The present invention member is laterally partitioned into two segments, a timing track and a plurality of laterally spaced parallel data channels.

When the present invention structure is dynamically subjected to an optical detection process commencing at the header zone, the structure provides all information required to transfer the data from the structure to a processing system. The first element which will be detected is a timing mark. The timing mark is typically indicia adapted to initiate the operation of the detection means. A band of identifiable indicia is laterally disposed across the structure perpendicular to all data channels. The band will initiate a machine check which will insure the machine is operating and data is not lost or incorrectly read.

Once operability is verified, the longitudinal data zone is entered. The timing marks synchronize this process. The data provided will include transaction indicia identifying the function the data is intended to represent. The data channels are separated by contrast stripes which will not interact with the detection means, but which will effectively and flexibly establish the limits of the separate channels. Indicia which will not absorb the output of an incident light source can be disposed between the timing marks as well as within the data channels themselves. As an example, the matter between the timing marks will indicate an item, the matter within the data channels identifying the quantity thereof.

The third longitudinal zone is optional and generally unrelated to data detection. The third zone is severable from the other section, and adapted to be severed along a perforation line. This zone can be utilized for notes or other matter which has significance to the specific application involved.

It is an object of the present invention to provide a structure which enables the recording of machine-readable mark data upon initial perception of the data.

It is another object of the present invention to provide a structure which enables the reading device to be synchronized with the mark data.

It is still another object of the present invention to provide a structure which will initiate a verification check of the detection device upon the initiation of the detection process.

It is still yet another object of the present invention to provide a paper data bearing structure which enables the disposition of mark data thereon within predetermined printed indicia, the combination of the printed indicia and mark data facilitating the detection of the mark data and the understanding of the record.

The novel features which are believed to be characteristic of the invention, both as to its organization and method of operation, together with further objectives and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

DESCRIPTION OF THE PRESENTLY PREFERRED EMBODIMENT

Figures 1, 2, 3, 4:
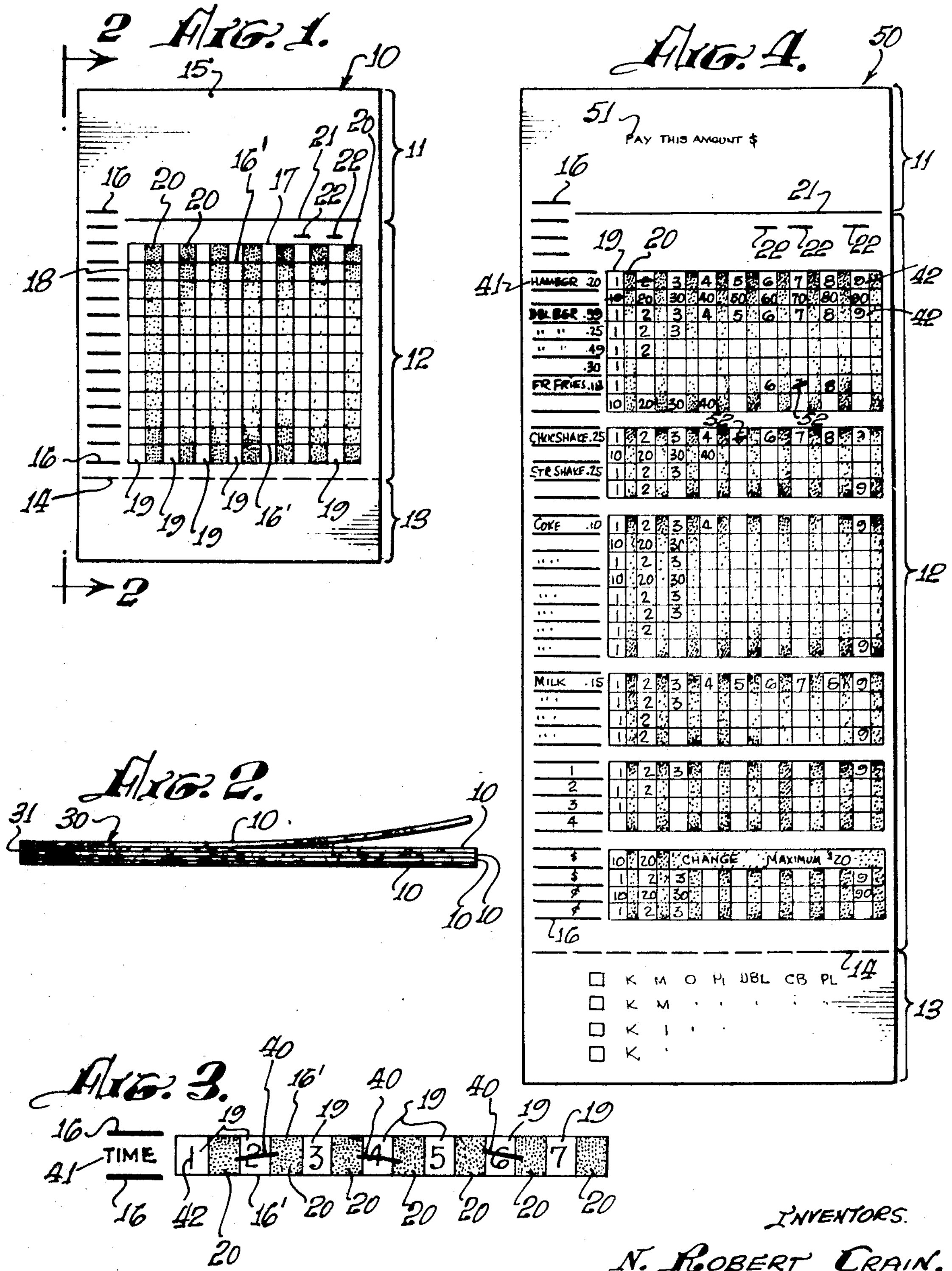
FIG. 1 is an embodiment of the present invention data bearing structure.
FIG. 2 is a side view taken along line 2—2 of FIG. 1 illustrating the manner in which the present invention structure can be bound together.
FIG. 3 is an enlarged view of marked data channels relative to the timing track in accordance to the present invention.
FIG. 4 is a restaurant billing slip made in accordance with the present invention.

The present invention data bearing structure can be best understood by reference to FIG. 1 wherein the present invention structure is generally designated by the reference numeral 10.

The structure 10 is longitudinally portioned into a header zone 11, data zone 12 and a notation or tear zone 13 being severably affixed to the bottom portion of the first section by the perforated line 14. The structure 10 is fabricated of conventional paper stock, the color of which possesses characteristics which precludes the absorption of a substantial amount of impinging light.

The header zone 11 presents an open area 15 which can be provided with such additions as advertising indicia or for printed output imprinted by such means as a printing mechanism. The present invention data bearing structure 10 is intended to be used with a system which will dynamically read the data. Pursuant to this procedure the header zone 11 is the first portion of the present invention structure 10 to be processed. The lower portion of the header zone 11 contains the initial timing mark 16. The timing marks 16 are uniformly distributed and spaced along the left-hand margin of the structure 10. The timing marks 16 are opaque, light absorbing indicia or means. It would be obvious that the timing marks 16 could be implemented by the disposition of a magnetic material if the present invention structure 10 were to be used in conjunction with a magnetic detection device. The timing marks 16 are configured to cooperatively interact with the movement of the structure 10 and specifically with the speed at which the structure 10 is being processed. For example, if the present invention structure 10 is being read at a speed of 10 inches per second, the timing marks 16 will be spaced approximately 0.2 inch apart. This would provide approximately 20 milliseconds to read the data disposed between a specific set of timing marks 16.

In the case where the structure 10 is being used with an optical detection system, the light absorbing qualities of a timing marks 16 will provide means to initiate a synchronizing signal at the detection device. The data temporally following the timing marks 16 would then be read with the assurance that the positioning is proper, the errors due to misregistration having been negated.

The information to be stored and/or processed by the data bearing structure 10 is encompassed within the data zone 12. The data area is defined by the printed horizontal lines 17 and vertical lines 18. A plurality of laterally spaced, parallel data channels 19 are disposed in spaced relation across at least part of the width of the structure 10. The parallel data channels 19 are spacially divided by the nonabsorbant areas or control stripes 20. The data channels 19 are between the nonabsorbing separation areas 20 which provide means to define a plurality of longitudinally extending, parallel sources of data. The time division of the data is established by the timing marks 16 and their extensions 16'. The data read by the detection device at any instant of time will be that disposed between any two lines 16' corresponding to the aligned timing marks 16. The data will be read in parallel, the maximum number of data marks corresponding to the number of data channels 19. The interpretation given to the data can be any logical convention adopted by the user, the specific manner of encoding the data not being a part of the present invention. The detection of excessive skew can be made by comparing the detection indicators of the outermost data channels 19 upon the passage of the detection system check member 21. An excessive time interval will indicate a possible skew problem and will initiate rejection of the data control device 10.

The initial portion of the data zone 12 contains means for verifying the operability of the detection equipment. The detection system check member 21 is disposed substantially perpendicular to the data channels 19 and fully traversing the lateral areas of the data channels 19. Although FIG. 1 illustrates the detection system check member 21 as a unitary member, it would be obvious to one with skill in the art that the check member 21 could be apportioned into as many segments as there are data channels 19, the segments traversing only the area of the data channels 19 excluding the separation areas 20. The embodiment shown in FIG. 1 is for the purpose of description and example only. The detection system check member 21 follows the first timing mark 16 by a distance which is established by the characteristic of the detection system. To compensate for skew, the check member 21 is shown at the midpoint between the first two timing marks 16. Although the embodiment of the present invention data control device 10 shown in FIG. 1 and FIG. 4 has detection system check member 21 following the first timing mark 16, detection system check member 21 could be located at any suitable longitudinal position. The detection system is typically an optical detection apparatus, therefore the check member 21 is a highly opaque, energy absorbing member capable of absorbing the energy of an impinging light source, such as nonreflective black ink. Timing marks 16 also provide means for registering the proper location of data control device 10 for a subsequent print operation. This enables the detection system to properly interpret the specific spatial area amenable to printing when the embodiment of the data control device 10 calls for printing within data zone 12.

The next data to be processed are the transaction indicators 22. The transaction indicator 22 are encoded means for defining the specific use or program applicable to structure 10. The structure 10 can be adapted to be used for such diverse tasks as inventory control sheets, employee time sheets and restaurant order billing forms. The later embodiment of the present invention is more fully described with reference to FIG. 4.

The data to be inserted will be visually recorded and recognizable by nonabsorbing the indicia disposed between the timing marks 16 or their extensions 16'. The manner of disposing data upon the structure 10 is discussed in detail below.

The third portion of the data bearing structure 10 is the notation or tear position 13. The tear portion 13 is affixed to the data zone 12 by the perforated line 14. The tear portion 13 can contain notes or other indicia not related to the data detection process but related to an overall control system.

Referring now to FIG. 2 a pad 30 of the data bearing structures 10 are shown. The structures 10 are aligned and a corresponding edge 31 of each structure 10 is bound by conventional and known methods. The illustration shown in FIG. 2 sets forth a practical manner in which the structures 10 will be maintained prior to application by the user.

The manner of disposing data upon the structure 10 can be best understood by reference to FIG. 3 wherein an enlarged lateral section of the structure 10 is shown. The unshaded areas represent the portions of the parallel data channels 19 with the shaded regions comprising the channel separation areas 20. The absence of any mark in the data channel 19 will result in reflection of a substantial amount of the incident light thereby giving the proper logical indication to the detection means. The presence of a mark 40 in a data channel 19 represents a light absorbing member which will preclude the reflection of an amount of incident light sufficient to produce a logical indication opposed to that set forth above. A combination of several encoded marks 40 may be utilized by a specific system and transaction. The manner of encoding the marks 40 may be by conventional, known techniques and not a part of this invention.

Disposition of the marks 40 upon the data channels 19 is carried out with conventional instruments which will insert opaque marks capable of absorbing the energy of an impinging light source. Any ordinary black pencil of any degree of hardness between F and 3H may be employed. Since the data are identifiable by the light absorption quality of the marks 40, erasures and remarking are permissable. The separation areas 20 define the latitude of the data channels 19 and the areas for placing the marks 40. The timing marks 16 determine the initialization and timing of the detection process, therefore the marks 40 will longitudinally follow a timing mark 16.

The present invention data bearing 10 can be marked with extraneous information which will not absorb the energy of an incident light source and, therefore, will not erroneously indicate the presence of legitimate data. Generic indicia 41 can be provided between the timing marks 16 to indicate a specific generic group of data and species indicia 42 disposed in the data channels 19 to provide selections from the generic group 41. The generic and species indicia 41 and 42 are typically colored print of a hue which will substantially reflect impinging light. The example set forth in FIG. 3 illustrates three species indicia 42 with disposed marks 40 indicating exemplary selections from the generic group 41 indicated as "time."

A specific embodiment of the data bearing structure 10 is set forth in FIG. 4, the structure being generally designated by the reference numeral 50. The structure 50 is an embodiment of the present invention sufficient to perform the function of a restaurant billing and order slip. The header zone 11 has included herein indicia 51 for indicating the total amount due on the restaurant billing slip. This will be disposed within the header zone 11 by indicia having nonabsorbing characteristics. The relationship of the header zone 11 to the data zone 12 in which the significant data is included is important in the sense that it provides sufficient spacing to permit printing and detection to be carried out in a single pass through a machine and it provides space for placement of the detection means and printing means along its path of travel.

Generic indicia 41 have been disposed between the timing marks 16, the generic indicia 41 representing specific types of food and drinks being served by the user and the prices being charged therefor. The species indicia 42 disposed within the data channels 19 determine the quantity of the generic group 41 being ordered by customers. In this example, the detection means will evaluate the total amount of the bill based upon placement of marks 52 in the data channel 19. As an illustration of the flexibility of the structure 50, a portion of the data zone 12 is allocated to a determination of the amount of change to be received by the customer. Once the amount of the bill is evaluated and printed in proper registration with the indicia 51 the change may be printed therebelow.

In the embodiment of the present invention set forth in FIG. 4, a tear portion 13 is affixed to the data zone via the perforated lines 14. The tear portion 13 would not take part in the detection procedure. This portion can be severed from the remainder of the structure 50 to be used for other purposes such as the order to the chef, bookkeeping, inventory control or personnel management.

The structure 50 is only one example of the possible embodiments of the present invention. By altering the text of the nonabsorbing generic and species indicia 41 and 42, the structures could be converted into employee time sheets, inventory accounting sheet or any other type of application which requires rapid tabulation of data. Since timing marks 16 provide means for proper registration of data control device 10 for printing operations, alternative embodiments of data control device 10 could be used for applications requiring printed indicia over a broad area of the structure.

It should be apparent from the above description the present invention provides a data entry structure which may be readily prepared at the point of sale. The entries may be made with a single ordinary pencil by anyone able to read letters and numbers. There are no arithmetic operations required for the entries. The structure presents a complete visual record of the transaction in addition to the machine processable data, timing means, and system check means and program selection means. The structure is low in cost readily susceptible to padding and writing. The perforated section enables the structure to be completely integratable for use in total business systems.

We claim:

1. A structure for the recording of data detectable by a detection system comprising:

a. a paper member of predetermined size;

b. a plurality of timing members longitudinally disposed upon said paper member in a uniform manner, said timing members adapted to evoke given timing signals from the detection system;

c. a plurality of data channels longitudinally disposed upon said paper member, said data channels being disposed with respect to said timing members and adapted to receive marked data;

d. separation means for laterally separating each of said data channels, said separation means disposed upon said paper member and adapted to reflect incident energy; and e. a detection system check member disposed upon said paper member in parallel registration with a portion of said timing members and aligned with respect to said data of said data channels.

2. A structure as in claim 1 wherein said structure includes means for enabling identification of a transaction, said means disposed upon said paper member in parallel registration with a portion of said timing members.

3. A structure as in claim 1 wherein first visual representation indicia is located between at least one pair of said timing marks, said indicia representation means representing a generic group and reflecting incident energy.

4. A structure as in claim 3 wherein said visual representation indicia are located in at least one of said data channels, said indicia reflecting incident energy, representing information about said generic group and aligned with said first visual representation indicia.

5. A structure for the recording of data detectable by an optical detection system comprising:

a. a paper member of predetermined size adapted to substantially reflect incident light;

b. a plurality of substantially parallel timing members uniformly disposed along a first portion of said paper member;

c. a plurality of longitudinal data channels in parallel spaced relation disposed upon a second portion of said paper member, said data channel in substantially parallel registration with a portion of said timing members;

d. a plurality of separation members in parallel spaced relation intersticially disposed between said plurality of data channels;

e. a detection system check member disposed upon said paper member in perpendicular alignment with said data channels and integral with said data channels, said detection verification member in parallel registration with a portion of said timing members; and f. a transaction member disposed upon said paper member and being perpendicular and integral with a portion of said data channels, said transaction members being intersticially aligned with a portion of said timing members.

6. A structure as in claim 5 wherein said timing members, detection system check member and said transaction members are adapted to absorb the energy of an incident light source.

7. A structure as in claim 6 wherein said structure includes a notation paper member secured to a portion of said structure by a perforated line.

8. A structure as in claim 6 wherein said data channels are adapted to substantially reflect the energy of an impinging light source.

9. A structure as in claim 6 wherein printed indicia are disposed upon said paper member intersticial with portions of said timing members and said data channels, said printed indicia being adapted to substantially reflect the energy of an impinging light source.

10. A data bearing structure for the recording of data detectable by an optical sensing device comprising:

a. a first paper member of a predetermined size, said first paper member adapted to substantially reflect the energy of an incident light source;

b. a plurality of parallel timing members longitudinally disposed upon the surface of a first portion of said first paper member in uniform spaced relation, said timing members adapted to substantially absorb the energy of an incident light source;

c. a plurality of parallel data channels longitudinally disposed in spaced relation upon a second portion of said first paper member, said data channels adapted to receive a data mark;

d. a plurality of separation members each intersticially established between given pairs of said data channels, said separation members adapted to substantially reflect the energy of an incident light source;

e. a detection system check member disposed upon said first paper member transversely aligned to said data channels, parallel to said timing members and in registration with a given point between given ones of said timing members, said detection system check member adapted to absorb the energy of an incident light source;

f. a transaction member disposed upon said second portion of said first paper member, transversely aligned to said data channels, parallel to said timing members and in registration with a given point between given ones of said timing members, said transaction members adapted to absorb the energy of an incident light source; and, g. a second paper member secured to said first paper member by a perforated line.

11. A data bearing structure as in claim 10 wherein printed indicia are disposed upon said first paper member intersticial with portions of said timing members and said data channels, said printed indicia being adapted to substantially reflect the energy of an incident light source.

* * * * *